(12) United States Patent
Jeune et al.

(10) Patent No.: US 10,372,398 B2
(45) Date of Patent: Aug. 6, 2019

(54) FOLDABLE DISPLAY DEVICE WITH INTERACTABLE USER INTERFACE SURFACE ON THE EXTERNAL SHELL

(71) Applicant: Microsoft Technology Licensing, LLC, Redmond, WA (US)

(72) Inventors: Charlene M. Jeune, Redmond, WA (US); Adolfo H. Santisteban, Bothell, WA (US); Donna K. Long, Redmond, WA (US); Aaron M. Burns, Newcastle, WA (US); Brian Keane, Bellevue, WA (US); Yevdokia K. Mashak, Seattle, WA (US); Jamie Cabaccang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/478,963

(22) Filed: Apr. 4, 2017

(65) Prior Publication Data
US 2018/0285047 A1 Oct. 4, 2018

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1616* (2013.01); *G06F 1/1641* (2013.01);
(Continued)

(58) Field of Classification Search
CPC ........ G06F 3/1423; G06F 21/32; G06F 3/044; G06F 1/1677; G06F 1/1647; G06F 1/1641; G06F 1/1616
See application file for complete search history.

(56) References Cited

U.S. PATENT DOCUMENTS 7,821,780 B2 10/2010 Choy
8,760,405 B2 6/2014 Nam
(Continued)

FOREIGN PATENT DOCUMENTS

WO 1997022109 A1 6/1997

OTHER PUBLICATIONS

"Flip Phone with Three Displays", http://www.toxel.com/tech/2011/01/21/flip-phone-with-three-displays/, Published on: Jan. 21, 2011, 9 pages.
(Continued)

*Primary Examiner* — Rodney Amadiz
(74) *Attorney, Agent, or Firm* — Arent Fox LLP (57) ABSTRACT

Aspects of the present disclosure provide a foldable display device that includes a user interface surface located on an exterior cover section of the foldable display device that allows a user to interact with the user interface surface while the foldable display device is in a closed state. Interaction on the user interface surface during the closed state of the foldable display device may allow the user to select content to be shown on at least one display screen of the foldable display device on the interior section during a subsequent open state of the foldable display device. Additionally, the user interface surface may be configured to allow an object produced (e.g., drawn or written) on the user interface surface to be stored for display on at least one of the first display screen, the second display screen, or the user interface surface.

17 Claims, 6 Drawing Sheets

(51) Int. Cl.
*G06F 3/044* (2006.01)
*G06F 21/32* (2013.01)

(52) U.S. Cl.
CPC .......... *G06F 1/1647* (2013.01); *G06F 1/1677* (2013.01); *G06F 3/044* (2013.01); *G06F 21/32* (2013.01)

(56) References Cited

U.S. PATENT DOCUMENTS

| | | | |
|---|---|---|---|
| 8,803,816 | B2 | 8/2014 | Kilpatric et al. |
| 9,274,552 | B2 | 3/2016 | Ahn et al. |
| 9,335,793 | B2 | 5/2016 | Rothkopf |
| 9,367,154 | B2 | 6/2016 | Nagao |
| 9,541,958 | B2 | 1/2017 | Seo et al. |
| 2007/0182663 | A1 | 8/2007 | Biech |
| 2009/0298554 | A1* | 12/2009 | Kim .................... H01M 10/465 455/574 |
| 2010/0085382 | A1 | 4/2010 | Lundqvist et al. |
| 2010/0182246 | A1 | 7/2010 | Petschnigg et al. |
| 2010/0182265 | A1* | 7/2010 | Kim ...................... G06F 1/1616 345/173 |
| 2011/0117971 | A1 | 5/2011 | Kim et al. |
| 2011/0199361 | A1* | 8/2011 | Shin ....................... G06F 1/1616 345/211 |
| 2011/0209057 | A1 | 8/2011 | Hinckley et al. |
| 2012/0194448 | A1* | 8/2012 | Rothkopf ............. A45C 13/002 345/173 |
| 2012/0212423 | A1 | 8/2012 | Dondurur et al. |
| 2014/0137041 | A1* | 5/2014 | Jeon ...................... G06F 3/0482 715/815 |
| 2014/0282059 | A1 | 9/2014 | Oh et al. |
| 2015/0097755 | A1* | 4/2015 | Kim ...................... G06F 3/1446 345/1.3 |

OTHER PUBLICATIONS

"International Search Report and Written Opinion Issued in PCT Patent Application No. PCT/US2018/024697", dated Jun. 5, 2018, 11 Pages.

* cited by examiner

FOLDABLE DISPLAY DEVICE WITH INTERACTABLE USER INTERFACE SURFACE ON THE EXTERNAL SHELL

BACKGROUND

Mobile electronic devices, such as mobile phones, media players, and tablet computers are increasingly common. These types of devices typically include an integrated display device. In some instances, in order to overcome the size and space limitations that are generally associated with mobile devices manufacturers may offer mobile devices with dual displays that are hinged to open two display devices side-by-side to form one larger display.

SUMMARY

Aspects of the present disclosure provide a foldable display device that includes a user interface surface located on the exterior cover section ("external shell") of the foldable display device that allows a user to interact with the user interface surface while the foldable display device is in a closed state (e.g., a device that is in face-to-face configuration such as a closed laptop or tablet). Interaction on the user interface surface during the closed state of the foldable display device may selectively modify content to be shown on at least one display screen of the foldable display device on the interior section during a subsequent open state of the foldable display device.

In one example, a foldable display device is disclosed. The foldable display device may include a first section that includes a first display screen and a second section that includes a second display screen. The first section and the second section may be coupled along a longitudinal axis of rotation. In some examples, the first section and the second section may be configured in a closed state such that the first display screen and the second display screen are in a face-to-face configuration. The foldable display device may also include a third section that includes a user interface surface on reverse side of the first section. The user interface surface may be configured to allow an object produced on the user interface surface to be stored for display on at least one of the first display screen, the second display screen, or the user interface surface.

In another example, a method for controlling content to be displayed on a foldable display device is disclosed. The method may include detecting an input on a user interface surface located on an exterior cover section of a foldable display screen when the foldable display device is in a closed state. The method may further include identifying the input as an object produced on the user interface surface and storing the object for display on one or more of the user interface surface or a plurality of display screens located on an interior section of the foldable display screen. The object may be displayed on at least one of the plurality of display screens on the interior section when the foldable display device transitions from the closed state to an open state.

In another example, a computer readable medium for controlling content to be displayed on a foldable display device is disclosed. The computer readable medium may include code for detecting an input on a user interface surface located on an exterior cover section of a foldable display screen when the foldable display device is in a closed state. The computer readable medium may further include code for identifying the input as an object produced on the user interface surface and storing the object for display on one or more of the user interface surface or a plurality of display screens located on an interior section of the foldable display screen. The object may be displayed on at least one of the plurality of display screens on the interior section when the foldable display device transitions from the closed state to an open state.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Manufacturers, in order to overcome the size and space limitations of mobile devices that maintain the portability functionality, offer mobile devices with foldable configurations (e.g., laptops, tablets, etc.) such that the device including at least one display screen may be folded against a base section (e.g., keyboard or another display) in a face-to-face configuration. However, conventional foldable mobile devices require the user to open the device in order to interact with or use any functionality of the mobile device. However, opening the device for every interaction may not be feasible or desirable. For example, in a limited space environment such as an economy cabin of most airlines that provides limited space to comfortably open a foldable device, it may not be possible for user to interact with the device in the manner he or she would prefer. In other instances, the user may not want to open the foldable device due to privacy concerns that may expose the screen to other people around the foldable mobile device.

Aspects of the present disclosure solve the above-identified problem by providing a foldable display device that includes a user interface surface located on the exterior cover section of the foldable display device that allows a user to interact with the user interface surface while the foldable display device is in a closed state (e.g., a device that is in face-to-face configuration such as a closed laptop or tablet). Interaction on the user interface surface during the closed state of the foldable display device may allow the user to select content to be shown on at least one display screen of the foldable display device on the interior section during a subsequent open state of the foldable display device. For the purposes of the present disclosure, the term "content" may refer to any one or more of a plurality of applications, folders, subfolders, or files that may be available on the foldable display device. As a non-limiting example, if the user selects Microsoft Word® application by interacting with the user interface surface during the closed state of the foldable display device, the foldable display device may be configured to open Microsoft Word® application when the foldable display device transitions from the closed state to the open state (e.g., the first section and the second section are "opened" such that the first display screen and/or the second display screen are accessible to the user. Additionally or alternatively, the user, during the closed state of the foldable display device, may select a particular file (e.g., recipe file). In such instance, the foldable display device may prioritize opening/displaying the content selected on the user interface surface during the closed state when the foldable display device transitions to the open state.

In other examples, the user interface surface may be configured to allow an object produced (e.g., drawn or written) on the user interface surface to be stored for display on at least one of the first display screen, the second display screen, or the user interface surface. As discussed below, and for the purposes of the present disclosure, the term "object" may refer to one or more of objects drawn or scribed (e.g., figures), text, and/or graphic produced. In some examples, the user interface surface may be either another display screen or a durable material that includes display properties such as a fabric with light-emitting diode(s) (LEDs) intertwined in the fabric.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
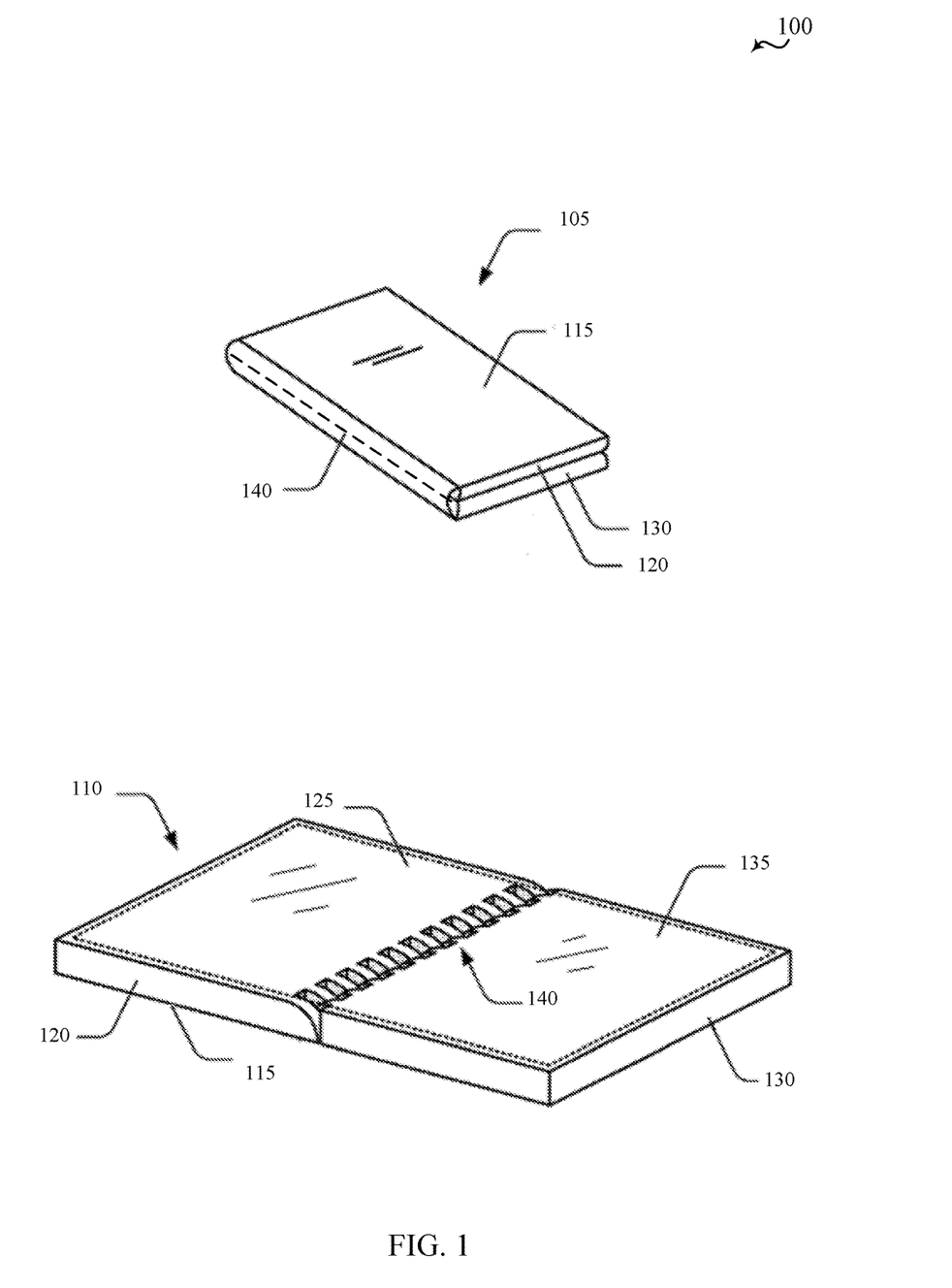
FIG. 1 is a schematic diagram of an example of a foldable display device in which features of the present disclosure may operate.

Turning first to FIG. 1, a foldable display device 100 is illustrated in both a closed state 105 and an open state 110. The foldable display device 100 may include a first section 120 that includes a first display screen 125 and a second section 130 that includes a second display screen 135. In some instances, however, the second section 130 may omit the second display screen 135 in favor of a touch panel or a keyboard (e.g., laptops). The first section 120 and the second section 130 may be coupled along a longitudinal axis of rotation 140 such that in a closed state 105, the first display screen 125 and the second display screen 135 may be in a face-to-face configuration.

The foldable display device 100 may also include a third section that may be an exterior cover section that may include a user interface surface 115 on the reverse side of the first section 120. It should be appreciated by those of ordinary skill in the art that the exterior cover section would additionally or alternatively include the reverse side of the second section 130. In some examples, the exterior cover section that includes the user interface surface 115 may either be a durable display or a fabric that includes LED properties while eliciting a texture that is different from a typical display screen. To that end, the fabric may be layered or woven through with one or more of touch capacitance, LEDs or organic LED (OLED) display covering at least portion of the fabric. The fabric may further include biometric or fingerprint sensors to identify the user holding (e.g., based on user fingerprints) the foldable display device 100. The biometric or fingerprint sensors may allow the foldable display device 100 to customize content based on the credentials of the detected user. In some examples, the foldable display device 100 may require authentication by the user when the foldable display device 100 is transitioned from a closed state 105 to an open state 110 before the selected content is displayed on the first display screen 125 and/or second display screen 135. The step of authenticating the user upon opening the foldable display device 100 may be bypassed (or skipped) if the user is authenticated based on the biometric or fingerprint sensors on the exterior section of the foldable display device 100.

In accordance with aspects of the present disclosure, the user interface surface 115 on the exterior cover section may be configured to allow interaction by a user with the user interface surface 115 to select content during the closed state 105 of the foldable display device 100. The selected content may be accessible to be shown on one or both of the first display screen 125 or the second display screen 135 during a subsequent open state 110 of the foldable display device 100. For example, a user may select from a plurality of applications that may be available on the foldable display device. Displaying a plurality of applications may include displaying graphical information, including icons, images, videos, and text associated with the applications that may be available on the foldable display device 100. Additionally or alternatively, the foldable display device 100 may include a pre-defined subset of applications/journals from a full set of applications/journals that the user may select from. Because the foldable display device 100 may be in the closed state 105 when the user interfaces with the user interface surface 115, the applications may be in idle or sleep mode. The term "idle or sleep mode" may refer to an inactive state of the application where one or more functionalities of the application are running in a background process of the processor (e.g., processor 305 in FIG. 3) associated with the foldable display device 100.

Thus, a user may be able to select from a plurality of applications by either selecting from a drop down menu or by swiping across the plurality of options, the application to launch in the subsequent open state of the foldable display device 100. It should be appreciated that the selection of content to be displayed is not limited to either selection from a drop down menu or swiping examples described above.

Instead, the indication of user's selection may be based on any one or more of swiping, tapping, double-tapping, drawing, or detection of a user's gesture. Further, the selection of the content may also be non-visual (e.g., associating different selections options to a different haptic feedback). With respect to the selection based on a drawing, the foldable display device 100 may include a predetermined objects that may be associated with a particular action. For example, the user drawing a cross on the user interface surface 115 may direct the foldable display device 100 to open a Microsoft Word® application, while drawing a circle may direct the foldable display device 100 to open a cookbook application.

Further, for each of the plurality of applications, the user interface surface 115 may further provide a list of subfolders or files that may be selectable. For instance, if a Microsoft Word® application is selected, the user may further be provided options to select from a list of available Word files. In some examples, the selected application may be prioritized for activation when the foldable display device 100 transitions from the closed state 105 to an open state.

Additionally or alternatively, the user interface surface 115 on the exterior cover section may be configured to allow an object produced (e.g., drawn or written by either a finger, pen or stylus interaction) on the user interface surface 115 to be stored for display on at least one of the first display screen 125, the second display screen 135, or the user interface surface 115. For example, a self-reminder such as text of "buy flowers" or "buy milk" may be written on the user interface surface 115 or alternatively a flower may be drawn by the user interaction on the user interface surface 115. The object produced may be stored for display on either one or more of the display screens (e.g., first display screen 125 or the second display screen 135) or the user interface surface 115 when triggered by the user, for example, by initiating a save action (e.g., double tapping the stylus on the user interface surface or clicking on 'save' icon).

Figure 2A:
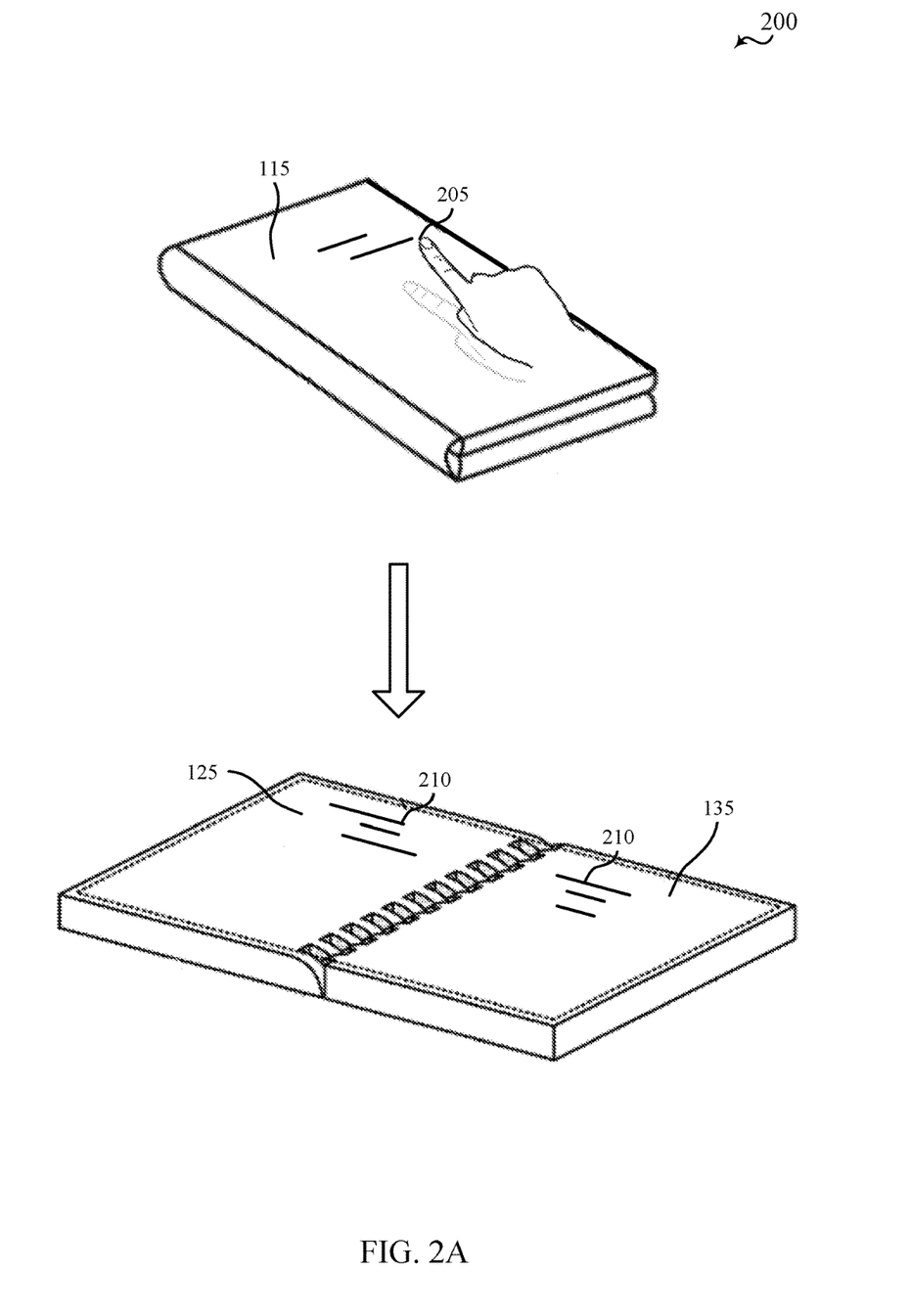
FIG. 2A illustrates an example of an interaction with the user interface surface selectively modifying content on at least one display screen of the foldable display device in accordance with aspects of the present disclosure.

FIG. 2A is a diagram 200 of an interaction 205 with the user interface surface 115 that allows the user to select content on at least one display screen (e.g., first display screen 125 or second display screen 135) of the foldable display device 100 when the foldable display device 100 transitions from a closed state 105 to an open state 110. While diagram 200 illustrates the user interface surface 115 encompassing the entire exterior cover section, those of ordinary skill would appreciate that the user interface surface 115 can be a portion of the exterior cover section and is not limited to the entire area of the exterior cover section.

In one example, while the foldable display device 100 is in the closed state 105, the user interface surface 115 on the exterior cover section may display a plurality of applications, folders, subfolders, or files that may be available on the foldable display device 100. The plurality of applications, folders, subfolders, or files may be displayed in any manner, including, but not limited to, dropdown menus options, scrolling list, or searchable format where a user writes at least partial name of the application, folder, subfolder, or file to open during the subsequent open state. For instance, a user may write or select "cookbook" on the user interface surface 115 during the closed state. Selection of the "cookbook" content may trigger the foldable display device 100 to search the database in the memory of the foldable display device 100 to identify applications, folders, subfolders, or files that may be associated with the term "cookbook" in order to find and open the appropriate application, folder, or file. This may include, for example, electronic cooking books or user created recipe files. Accordingly, in some examples, the foldable display device 100, based on the selection of the content on the user interface surface 115, may prioritize the selected content 210 from a plurality of contents to be displayed by activating applications associated with the selected content ahead of applications associated with non-selected content. The selected content 210 may be displayed on at least one or both of the first display screen 125 or the second display screen 135 when the foldable display device 100 transitions from the closed state 105 to the open state 110.

Figure 2B:
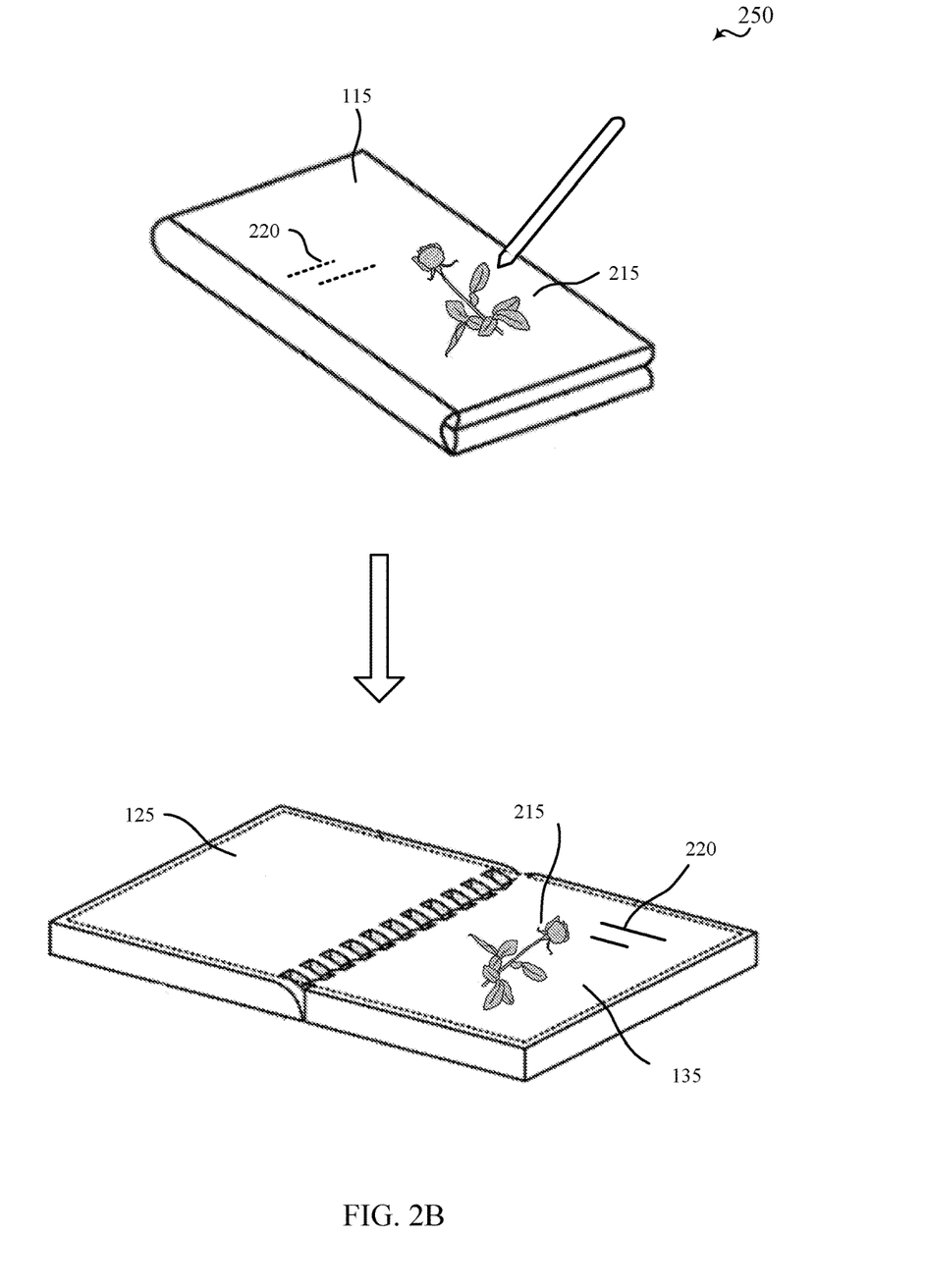
FIG. 2B illustrates a technique of the present disclosure that allows an object drawn on the user interface surface to be stored for display on at least one display screen of the foldable display device.

FIG. 2B is a diagram 200 of the foldable display device 100 that allows an object 215 produced (e.g., drawn or written by interaction with one or more of user's finger, pencil, or stylus) on the user interface surface 115 on the exterior section of the foldable display device 100 to be stored for display on at least one display screen (e.g., first display screen 125, second display screen 135) of the foldable display device or the user interface surface 115 itself. For instance, the object 215 in the illustrated example may be a flower corresponding to text 220 "buy flowers" that may be written by the user on the user interface surface 115 as a reminder. In accordance with features of the present disclosure, the term "object" may broadly encompass either the object 215 itself and/or the corresponding text 220. Thus, for the purposes of this disclosure, where the user interface surface may be configured to allow an "object" produced on the user interface surface to be stored for display on at least one of the first display screen, the second display screen, or the user interface surface, the term "object" may refer to one or both of any figure that is drawn, text that is written, or a graphic produced by the user as an interaction on the user interface surface. Once scribed, the object 215 may be clicked on (or tapped) with a stylus, for example, to store the object 215 and text 220.

Once the object 215 or corresponding text 220 written is saved, the foldable display device 100 may display the object 215 and/or corresponding text 220 on at least one display screen (e.g., first display screen 125, second display screen 135) of the foldable display device or the user interface surface 115. The object 215 may be displayed as a reminder to be viewed later one of the plurality of displays. In some aspects, once saved, the corresponding text 220 may be removed from the display of at least one display screen and/or user interface surface 115 while the object 215 remains as a reminder for the user. However, clicking on the object 215 may allow the corresponding text 220 to reappear (or redisplayed) so that it may remind the user of the correlation or any "to-do" tasks. Thus, in some aspects, the foldable display device 100 may hide or remove the corresponding text 220 from being displayed on at least one of the plurality of display screens or the user interface surface 115 during a first time period. Upon detecting a query (e.g., by way of user subsequently clicking on the object 215 as a user input), the foldable display device 100 may again display the corresponding text 220 on at least one of the plurality of display screens or the user interface surface during a second time period.

Figure 3:
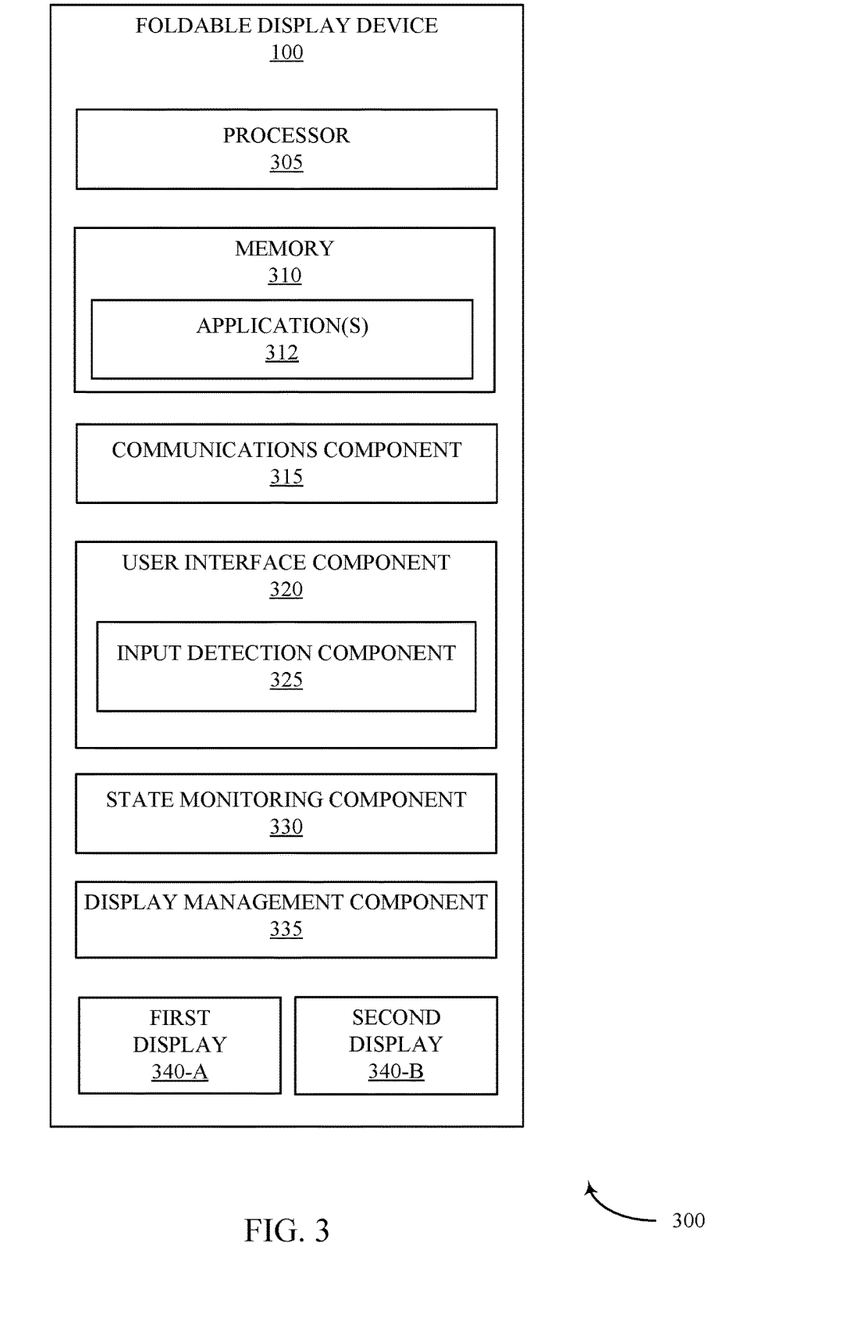
FIG. 3 is a diagram illustrating an example of a hardware implementation for the foldable display device in accordance with various aspects of the present disclosure.

Referring now to FIG. 3, a diagram illustrating an example of a hardware implementation for a foldable display device 100 in accordance with various aspects of the present disclosure is described. In some examples, the foldable display device 100 may include a processor 305 for carrying out one or more processing functions (e.g., method 400 and 500) described herein. The processor 305 may include a single or multiple set of processors or multi-core processors. Moreover, the processor 305 can be implemented as an integrated processing system and/or a distributed processing system.

The foldable display device 100 may further include memory 310, such as for storing local versions of applications being executed by the processor 305. In some aspects, the memory 310 may be implemented as a single memory or partitioned memory. In some examples, the operations of the memory 310 may be managed by the processor 305. Memory 310 can include a type of memory usable by a computer, such as random access memory (RAM), read only memory (ROM), tapes, magnetic discs, optical discs, volatile memory, non-volatile memory, and any combination thereof. Additionally, the processor 305, and memory 310 may include and execute operating system (not shown). The memory 310 may also include one or more application(s) 312 that may be available for the foldable display device 100. The processor 305 may execute one or more processes associated with the applications 312.

Further, foldable display device 100 may include a communications component 315 that provides for establishing and maintaining communications with one or more parties utilizing hardware, software, and services as described herein. Communications component 315 may carry communications between components on foldable display device 100, as well as between foldable display device 100 and external devices, such as to electronic devices coupled locally to the foldable display device 100 and/or located across a communications network and/or devices serially or locally connected to foldable display device 100. For example, communications component 315 may include one or more buses operable for interfacing with external devices.

The foldable display device 100 may also include a user interface component 320 operable to receive inputs from a user of foldable display device 100 and further operable to generate outputs for presentation to the user. In some examples, the user interface component 320 may be part of the user interface surface 115 described with reference to FIG. 1. User interface component 320 may include one or more input devices, including but not limited to a touch-sensitive display, a navigation key, a function key, a microphone, a voice recognition component, any other mechanism capable of receiving an input from a user, or any combination thereof. Further, user interface component 320 may include one or more output devices, including but not limited to a display, a speaker, any other mechanism capable of presenting an output to a user, or any combination thereof. In some examples, the user interface component 320 may further include an input detection component 325 for detecting an input on a user interface surface located on an exterior cover section of a foldable display device 100 while the foldable display device 100 is in a closed state.

The foldable display device 100 may also include a state monitoring component 330 to identify the current state of the foldable display device 100. For example, based on detecting the proximity of the first section (or first display screen) to the second section (or the second display screen), the state monitoring component 330 may determine whether the foldable display device 100 is in a closed state (e.g., first section and the second section in a face-to-face configuration) or in an open state (e.g., first section and the second section in a side-by-side configuration). While the "face-to-face" configuration and "side-by-side configuration" as illustrated in FIG. 1 may respectively define the foldable display device state as either closed or open, it should be appreciated by those of ordinary skill that the state transitions are not limited to such extremes. Instead, variables between the two configurations (e.g., partially open or closed) may also allow the state monitoring component 330 to identify the state of the foldable display device 100 as open or closed. For example, state monitoring component 330 may be configured to identify the foldable display device 100 as being in the closed state when an angle formed between the first section 120 and the second section 130 about the longitudinal axis of rotation 140 is less than a state threshold value (e.g., 30 degrees). Conversely, state monitoring component 330 may configured to identify the foldable display device 100 as being in the open state when an angle formed between the first section 120 and the second section 130 about the longitudinal axis of rotation 140 is greater than a state threshold value (e.g., 30 degrees). It should be appreciated that the 30 degrees example is only used as one example, and the state threshold value can be adjustable based on the type of the foldable display device 100. Thus, in some examples, the state monitoring component 330 may identify the foldable display device 100 when an angle formed between the first section 120 and the second section 130 is greater than 180 degrees (e.g., the foldable display device 100 configured in a "tent" position where the first display screen 125 and the second display screen 135 are facing outwards.

The foldable display device 100 may also include a display management component 335 for modifying content to be displayed on at least one of a plurality of display screens (e.g., first display 340-a and/or second display 340-b) on an interior section of the foldable display device during a subsequent open state based on detecting an input on a user interface surface located on an exterior cover section during the closed state of the foldable display device 100. In some examples, the interior section may refer to the first display screen and the second display screen (or the inside of the first section and the second section). Similarly, the exterior cover section may refer to the outer cover of the first display screen and the second display screen. The display management component 335 may also store an object for display on one or more of a the user interface surface or the plurality of display screens located on an interior section of the foldable display screen when the foldable display device 100 transitions from a closed state to an open state. In some examples, based on the user interaction on the user interface surface on the exterior cover section, the display management component 335 may activate one or more applications (or files) that were in sleep mode such that the selected applications and files are already opened and available to the user when the foldable display device 100 is opened. To that end, the display management component 335 may prioritize which applications to activate first when the foldable display device 100 transitions from closed state to open state.

Figure 4:
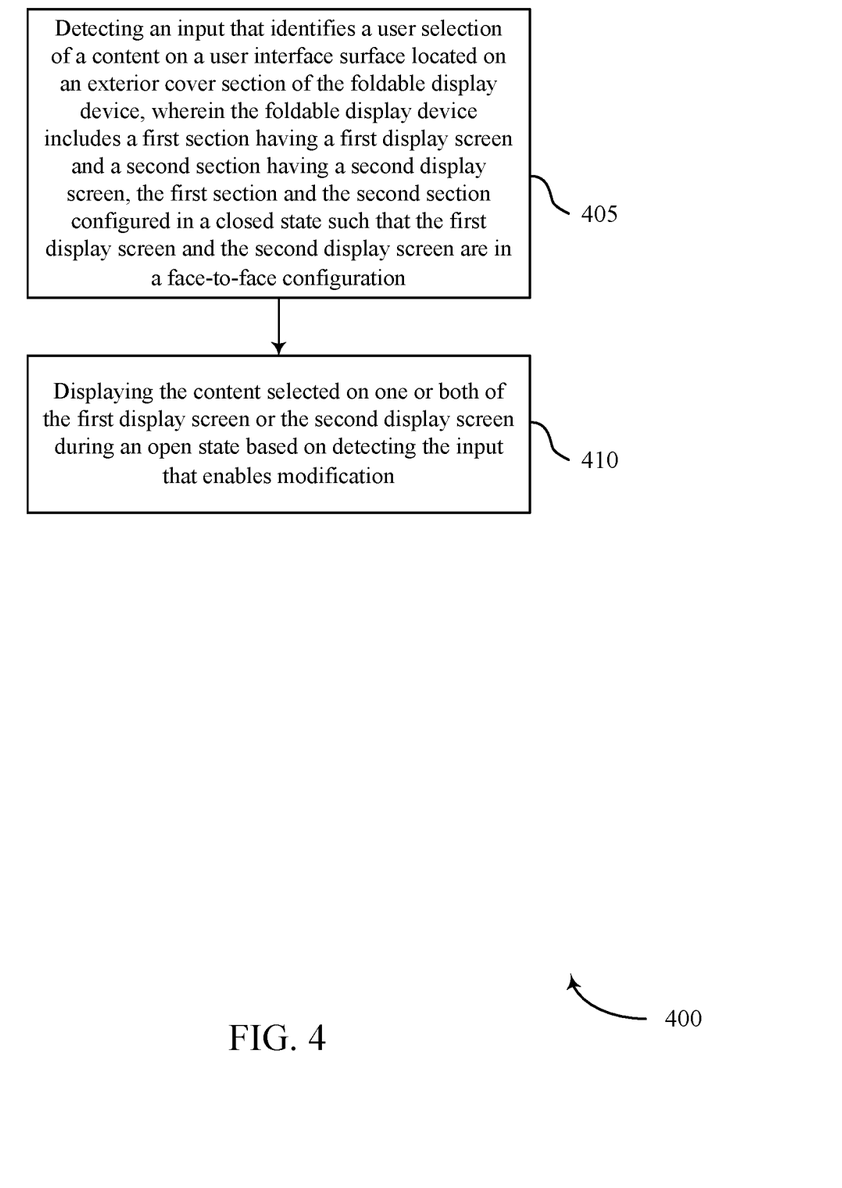
FIG. 4 is a flow chart of one method implemented on the foldable display device in accordance with various aspects of the present disclosure.

Referring to FIG. 4, an example method 400 for controlling content to be displayed on the foldable display device is described. The method 400 may be performed by the foldable display device 100 as described with reference to FIGS. 1 and 3. Although the method 400 is described below with respect to the elements of the foldable display device 100, other components may be used to implement one or more of the steps described herein.

At block 405, the method 400 may include detecting an input that identifies a user selection of a content on a user interface surface located on an exterior cover section of a foldable display device. The foldable display device may include a first section having a first display screen and a second section having a second display screen. The first section and the second section may be configured in a closed state such that the first display screen and the second display screen are in a face-to-face configuration. In some examples, the detecting the input on the user interface surface on the exterior cover section may be in response to the foldable display device displaying a plurality of applications (or subfolders/files) available on the foldable display device. In some aspects, when the plurality of applications are listed or displayed on the user interface surface during the closed state of the foldable display device, the plurality of applications may be in sleep state. However, the input on the user interface surface may trigger an application from the plurality of applications to transition from the sleep state to an active state when the foldable display device is subsequently transitioned from the closed state to the open state. Aspects of block 405 may be performed by input detection component 325 described with reference to FIG. 3.

At block 410, the method 400 may include displaying the content selected on one or both of the first display screen or the second display screen during an open state based on the input that enables selection. In some examples, selecting the content to be displayed may include prioritizing, based on the detecting of the input, a selected content from a plurality of contents to be displayed by activating applications, folders, subfolders, or files associated with the selected content ahead of applications associated with non-selected content. Aspects of block 410 may be performed by display management component 335 described with reference to FIG. 3.

Figure 5:
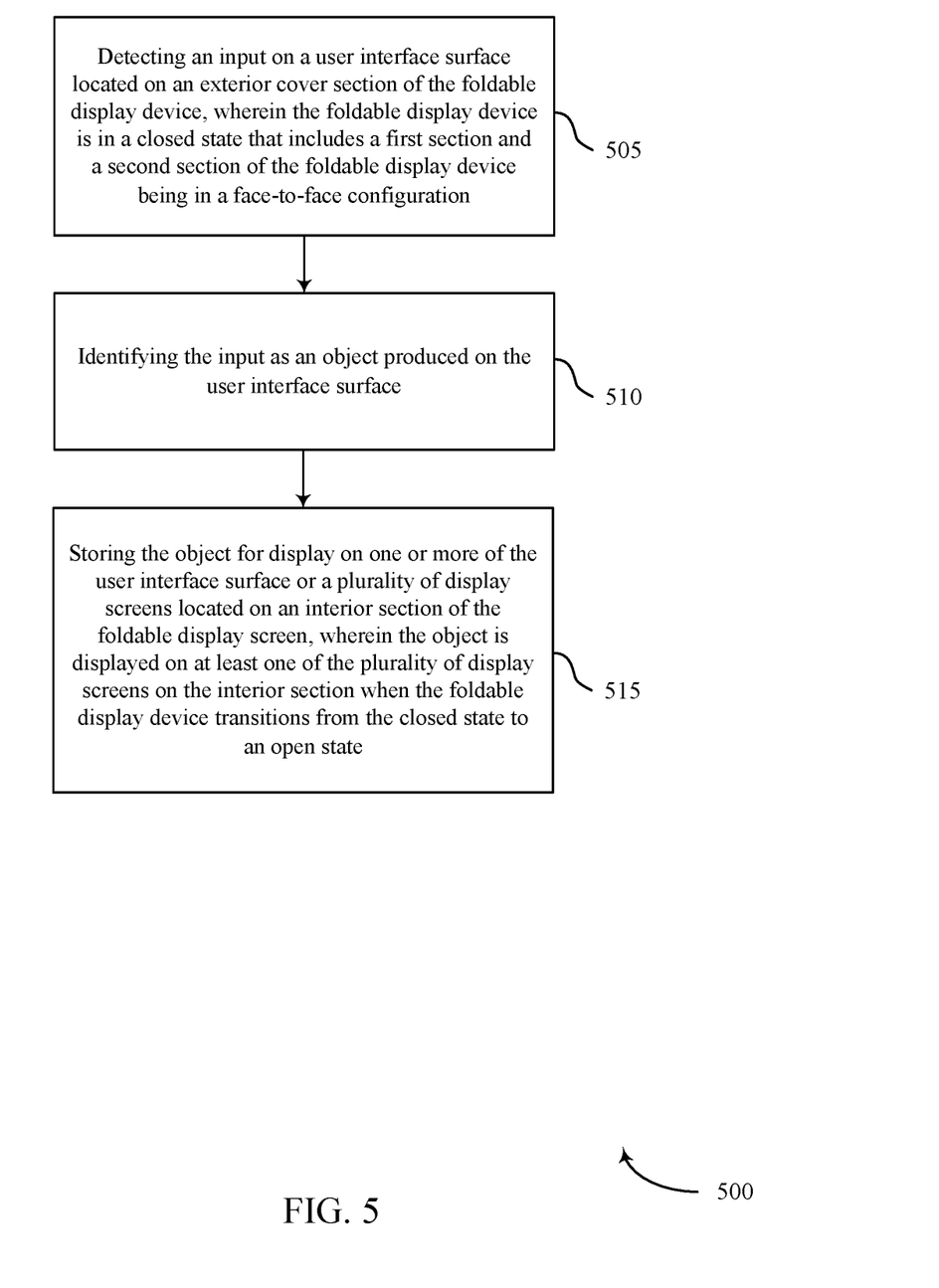
FIG. 5 is a flow chart of another method implemented on the foldable display device in accordance with various aspects of the present disclosure.

Referring to FIG. 5, another example method 500 for controlling content to be displayed on the foldable display device is described. The method 500 may also be performed by the foldable display device 100 as described with reference to FIGS. 1 and 3. Although the method 500 is described below with respect to the elements of the foldable display device 100, other components may be used to implement one or more of the steps described herein.

At block 505, the method 500 may include detecting an input on a user interface surface located on an exterior cover section of a foldable display device. The foldable display device may be in a closed state when the input is detected. Aspects of block 505 may be performed by input detection component 325 described with reference to FIG. 3.

At block 510, the method 500 may include identifying the input as an object produced on the user interface surface. Aspects of block 510 may be performed by display management component 335 described with reference to FIG. 3.

At block 515, the method 500 may include storing the object for display on one or more of the user interface surface or a plurality of display screens located on an interior section of the foldable display screen. The object may be displayed on at least one of the plurality of display screens on the interior section when the foldable display device transitions from the closed state to an open state. In some examples, the method may further include associated the object produced on the user interface surface with a corresponding text that is produced on the user interface surface. Aspects of block 515 may also be performed by display management component 335 described with reference to FIG. 3.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., foldable display device 100), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A foldable display device, comprising:
a first section that includes a first display screen;
a second section that includes a second display screen, wherein the first section and the second section are coupled along a longitudinal axis of rotation, the first section and the second section configured in a closed state such that the first display screen and the second display screen are in a face-to-face configuration; and
a third section that includes a user interface surface on reverse side of the first section, wherein the user interface surface is configured to allow an object produced on the user interface surface to be associated with text produced on the user interface surface and to be stored for display on at least one of the first display screen, the second display screen, or the user interface surface, wherein the object and the associated text are stored in response to the initiation of a save action, where the object and the text are produced via user interaction on a top surface of the user interface surface.

2. The foldable display device of claim 1, wherein the user interface surface allows the corresponding text to be hidden from the at least one of the first display screen, the second display screen, or the user interface surface during a first time period and to be displayed during a second time period, wherein the second time period is triggered based on detection of user input on the user interface surface.

3. The foldable display device of claim 1, wherein the foldable display device is configured to identify being in the closed state when an angle formed between the first section and the second section about the longitudinal axis of rotation is less than a state threshold value.

4. The foldable display device of claim 1, wherein the foldable display device is configured to identify being in the open state when an angle formed between the first section and the second section about the longitudinal axis of rotation is greater than a state threshold value.

5. The foldable display device of claim 1, wherein the third section that includes the user interface surface is a fabric with at least one or more of layered light emitting diodes or touch capacitance woven into the fabric.

6. A method for controlling content to be displayed on a foldable display device, comprising:
detecting an input on a user interface surface located on an exterior cover section of the foldable display device, wherein the foldable display device is in a closed state that includes a first section and a second section of the foldable display device being in a face-to-face configuration, and the user interface surface being on a reverse side of the first section;

identifying the input as an object produced on the user interface surface;

associating the object produced on the user interface surface with text that is produced on the user interface surface, where the object and the text are produced via user interaction on a top surface of the user interface surface; and storing the object and the associated text for display on one or more of the user interface surface or a plurality of display screens located on an interior section of the foldable display screen, wherein the object is displayed on at least one of the plurality of display screens on the interior section when the foldable display device transitions from the closed state to an open state.

7. The method of claim 6, further comprising:

hiding the corresponding text from being displayed on at least one of the plurality of display screens or the user interface surface during a first time period;

identifying a query for the object produced on the user interface surface based on user input; and displaying the corresponding text on the plurality of display screens or the user interface surface during a second time period.

8. The method of claim 6, further comprising:

identifying the foldable display device as being configured in the closed state when an angle formed between the first section and the second section about the longitudinal axis of rotation is less than a state threshold value.

9. The method of claim 6, further comprising:

identifying the foldable display device as being configured in the open state when an angle formed between the first section and the second section about the longitudinal axis of rotation is greater than a state threshold value.

10. The method of claim 6, wherein the exterior cover section that includes the user interface surface is a fabric with at least one or more of layered light emitting diodes or touch capacitance woven into the fabric.

11. The method of claim 6, further comprising:

authenticating, at the foldable display device, credentials of a user based on an input from biometric sensors included in the exterior cover section of the foldable display device, and wherein the object is displayed on at least one of the plurality of display screens on the interior section based on the authentication.

12. A non-transitory computer-readable medium for controlling content to be displayed on a foldable display device, comprising code for:

detecting an input on a user interface surface located on an exterior cover section of the foldable display device, wherein the foldable display device is in a closed state that includes a first section and a second section of the foldable display device being in a face-to-face configuration, and the user interface surface being on a reverse side of the first section;

identifying the input as an object produced on the user interface surface;

associating the object produced on the user interface surface with text that is produced on the user interface surface, where the object and the text are produced via user interaction on a top surface of the user interface surface; and storing the object and the associated text for display on one or more of the user interface surface or a plurality of display screens located on an interior section of the foldable display screen, wherein the object is displayed on at least one of the plurality of display screens on the interior section when the foldable display device transitions from the closed state to an open state.

13. The non-transitory computer-readable medium of claim 12, further comprising code for:

hiding the corresponding text from being displayed on at least one of the plurality of display screens or the user interface surface during a first time period;

identifying a query for the object produced on the user interface surface based on user input; and displaying the corresponding text on the plurality of display screens or the user interface surface during a second time period.

14. The non-transitory computer-readable medium of claim 12, further comprising code for:

identifying the foldable display device as being configured in the closed state when an angle formed between the first section and the second section about the longitudinal axis of rotation is less than a state threshold value.

15. The non-transitory computer-readable medium of claim 12, further comprising code for:

identifying the foldable display device as being configured in the open state when an angle formed between the first section and the second section about the longitudinal axis of rotation is greater than a state threshold value.

16. The non-transitory computer-readable medium of claim 12, wherein the exterior cover section that includes the user interface surface is a fabric with at least one or more of layered light emitting diodes or touch capacitance woven into the fabric.

17. The non-transitory computer-readable medium of claim 12, further comprising code for:

authenticating, at the foldable display device, credentials of a user based on an input from biometric sensors included in the exterior cover section of the foldable display device, and wherein the object is displayed on at least one of the plurality of display screens on the interior section based on the authentication.

* * * * *